(12) United States Patent
Stuerzlinger

(10) Patent No.: US 7,193,608 B2
(45) Date of Patent: Mar. 20, 2007

(54) COLLABORATIVE POINTING DEVICES

(75) Inventor: Wolfgang Stuerzlinger, Toronto (CA)

(73) Assignee: York University, Toronto (CA)

( * ) Notice: Subject to any disclaimer, the term of this patent is extended or adjusted under 35 U.S.C. 154(b) by 286 days.

(21) Appl. No.: 10/445,039

(22) Filed: May 27, 2003

(65) Prior Publication Data

US 2004/0239653 A1    Dec. 2, 2004

(51) Int. Cl.
    *G09G 5/08*    (2006.01)
(52) U.S. Cl. ................... 345/156; 345/157; 345/158
(58) Field of Classification Search ......... 345/156–184
    See application file for complete search history.

(56) References Cited

U.S. PATENT DOCUMENTS

| 5,515,079 | A | 5/1996 | Hauck | |
| 5,973,672 | A * | 10/1999 | Rice et al. | 345/158 |
| 6,275,214 | B1 * | 8/2001 | Hansen | 345/158 |
| 6,331,848 | B1 | 12/2001 | Stove | |
| 6,346,933 | B1 | 2/2002 | Lin | |
| 6,488,583 | B1 | 12/2002 | Jones | |
| 6,704,000 | B2 * | 3/2004 | Carpenter | 345/158 |
| 6,731,330 | B2 * | 5/2004 | Lin | 345/156 |
| 6,798,926 | B2 * | 9/2004 | Hiramatsu | 345/183 |
| 2001/0022575 | A1 * | 9/2001 | Wolfgang | 345/156 |
| 2002/0131643 | A1 | 9/2002 | Fels | |
| 2003/0132912 | A1 * | 7/2003 | Hamana et al. | 345/156 |

FOREIGN PATENT DOCUMENTS

| EP | 1 127 457 B1 | 8/2001 |
| WO | WO 01/46941 A1 | 6/2001 |

OTHER PUBLICATIONS

Kirstein, C.; Muller, H., Interaction with a projection screen using a camera-tracked laser pointer, Proceedings 1998 Multimedia Modeling, 1998, pp. 191-192, University of Dortmund, Dortmund, Germany.

Menier, G.; Poirier, F., Human-Compuet Inteaction, INETERACT'99. IFIP TC. 13 International Conference on Human-Computer Interaction, Part Number—vol. 2, 1999, pp. 51-52 vol. 2, University de Bretagne Sud, Vannes, France.

(Continued)

*Primary Examiner*—Bipin Shalwala
*Assistant Examiner*—David L. Lewis
(74) *Attorney, Agent, or Firm*—Blake, Cassels & Graydon LLP; John R. S. Orange; Brett J. Slaney

(57) ABSTRACT

A method and system for determining a position of laser spots in an initial image due to a plurality of laser pointer, the method having the steps of acquiring a sequence of images from a camera directed at the initial image to produce acquired images thereof, each said acquired image comprising image elements forming a frame; assigning each of said laser pointers a unique transmission pattern; registering said code of each of said laser pointers during frame i with a processor; determining said laser spots in said frame i; registering the appearance of the laser spots of each of the laser pointers during frame i with a processor; assigning positional coordinates to each said located laser spots so as to produce a sequence of positional coordinates $(x_i, y_i)$ corresponding to sequential positions of the laser spot in the initial image; whereby said laser spots appear in the captured images in a pattern corresponding to said unique transmission pattern and each of said laser pointers is uniquely identifiable and tracked.

19 Claims, 4 Drawing Sheets

OTHER PUBLICATIONS

Winograd, T.; Guimbretiere, F., Visual Instruments for an Interactive Mural, ACM SIGCHI CHI99 Extended Abstracts, 1999, pp. 234-235, Stanford University, Stanford, California, USA.

Eckert, R.R.; Moore, J.A., The Classroom of the 21st Century: The Interactive Learning Wall, SIGCHI Bull (USA), Apr. 2000, pp. 33-40, vol. 32 No. 2, Dept. of Computer Science, State University of New York, Binghamton, NY, USA.

Knudsen, R.; Enig, T.; Es Perge, D.A.; Mogensen, P., Human-Computer Interaction, Interact'01. IFIP TC 13 International Conference oN Human-Computer Interaction, 2001, pp. 775-776, Dept. of Computer Science, Aarhus University, Denmark.

Olsen. D.R.; Nielsen, T. Jr.; Laser Pointer Interaction, CHI 2001 Conference Proceedings. Conference on Human Factors in Computing Systems, 2001, pp. 17-22, Dept. of Computer Science, Brigham Young University, Provo, UT, USA.

Crone, M.; Jaensson, T, Design of an Interactive Table, Master Thesis, Sep. 2001, Dept. of Computer and System Sciences, Stockholm University/The Royal Institute of Technology, Stockholm, Sweden.

Cavens, D.; Vogt, F.; Fels, S.; Meitner, M., Interacting with the Big Screen: Pointers to Ponder, 2002, Electrical and Computer Engineering, Forest Resources Management, University of British Columbia, B.C., Canada.

Myers. B.A.; Bhatnagar, R.; Nichols, J.; Peck, C.H.; Kong, D.; Miller, R. Long, A.C., Interacting at a Distance: MEasuring the Performance of Laser Pointers and Other Devices, CHI 2002, Changing the World, Changing Ourselves, 2002, pp. 33-40, Vou. No. 4, Issue No. 1, Carnegie Mellon Univeristy, Pittsburgh, PA, USA.

Frolov, P.; Matveyev, S. Gobel, M.; Klimenko, S., Using Kalman Filter for Natural Hand Tremor Smoothing during the Interaction with the Projection Screen, 2002, pp. 94-101, Fraunhofer Institute for Media Communication, Sankt, Augustin, Germany and Institute of Computing for Physics and Technology, Protvino, Russia.

Davis, J.; Chen, X., LumiPoint: Multi-User Laser-Based Interaction on Large Tiled Displays, 2002, Computer Graphics Laboratory, Stanford Univeristy, Stanford University, Stanford, California, USA.

* cited by examiner

| Method | Blink-on | Binary | Blink-off |
|---|---|---|---|
| laser pointer #1 | 001 | 001 | 110 |
| laser pointer #2 | 010 | 010 | 101 |
| laser pointer #3 | 100 | 011 | 011 |
| laser pointer #4 | N/A | 100 | N/A |
| ...... | ... | .. | .... |
| laser pointer #7 | N/A | 111 | N/A |
| Percentage on | 33% | Varies | 66% |

COLLABORATIVE POINTING DEVICES

BACKGROUND OF THE INVENTION

1. Field of the Invention

The present invention relates in general to collaborative pointing devices, more specifically it relates to laser pointers.

2. Description of the Prior Art

Single Display Groupware (SDG) is defined as a system that can support collaborative work between people that are physically in relative proximity, such as in the same room. Since users are sharing a display in the same room, they are free to interact face to face, which facilitates collaboration. General computer systems are designed to support interaction with only one user at a time. Traditionally, most hardware platforms for SDG support only one person interacting at any given time, which limits collaboration, and so when multiple users want to use a computer collaboratively, they are currently forced to take turns to control the system. If there is only one interaction device that is wired to the computer, the device can only be used in a limited range. If participants in the back of the room want to contribute, they have to come to the front to use the interaction device. Even worse, since there is only one input device available, participants are forced to go through the process of acquiring the device before they can contribute their ideas.

Ideally, a SDG system should provide multiple independent input streams so that several users can control a display at the same time without waiting for their turn to use the single input device. One of the solutions that has been proposed includes a system with multiple remote devices to facilitate participation by a plurality of participants. A drawback of this scheme is that there is a need for accountability for each participant's actions; therefore each pointing device must be tracked in order to uniquely identify same. One of the proposed solutions to track multiple laser spots uses prediction by assigning the laser spot that is closest to each predicted position to the corresponding laser pointer. However, this proposed solution fails when multiple laser spots come in close proximity. Also, it is particularly difficult to reliably attribute the laser spots different laser pointers, since the laser pointer may have left the screen or turned off by the user.

Another way to distinguish between different laser pointers has been to use different colored lasers. However, laser pointers outside the 650–680 nm range are relatively expensive, and bright laser spots often saturate the image sensors or CCDs of the camera, and thus it is relatively hard to reliably detect the color of a laser pointer from the image.

Therefore, it is an object of the invention to obviate or mitigate at least of one of the above-mentioned problems.

SUMMARY OF THE INVENTION

In one of its aspects there is provided a system for allowing multiple computer controlled laser input devices as interaction devices for one or more displays. The system allows collaboration between a plurality of users. Each user has a laser input device for interacting with an initial image and the system has:

a controller for controlling operation of the laser input devices and registering interactions by the users via the laser input devices;

an initial image provider for providing the initial image on the display;

a camera for capturing successive images to form a sequence of captured images thereof; for processing and mapping the captured image to the initial image; the captured image having a plurality of picture elements;

each of the laser input devices caused by the controller to transmit a laser beam of a distinct pattern, the laser beam producing a laser spot on the initial image;

a processor for analyzing the captured sequence of images to determine the presence of the laser spots, the laser spots appearing in the sequence of captured images corresponding to the distinct pattern;

whereby the processor determines a relationship between each pixel in the captured images and the corresponding pixel on the initial images and determines interactions on the display associated with each of the laser input devices, such that laser spots to each of the laser input devices are uniquely identified in accordance with the distinct pattern.

In another of its aspects, the invention provides a method of determining a position of a laser spot on an initial image due to a plurality of laser pointers, the method having the steps of:

acquiring a sequence of images from a camera directed at the initial image to produce captured images thereof, each of the captured images comprising image elements forming a frame;

assigning each of the laser pointers a unique transmission pattern;

registering the appearance of the laser spots of each of the laser pointers during frame i with a processor;

registering the appearance of the laser spots of each of the laser pointers during frame i+1 with the processor;

assigning positional coordinates to each of the located laser spots so as to produce a sequence of positional coordinates $(x_i, y_j)$ corresponding to sequential positions of the laser spot in the initial presentation image;

predicting a location of the laser spot in the frame i based on positional coordinates $(x_i, y_j)$ of lasers spots located in preceding frame i−1;

determining which of the laser input devices was transmitting during the frame i by designating a laser spot closest to a predicted location as current position or using predicted location as current position; and reporting the location of the laser spot in frame i, whereby the laser spots appear in the acquired images in a pattern corresponding to the unique transmission pattern and each of the laser pointers is uniquely identifiable and tracked.

Advantageously, the controller causes said laser beam to be emitted for less than 0.25 seconds, thus making the laser pointers eye-safe. Also, as a further preference, if the laser spot is not detected in a predetermined number of successive captured images, the laser beam is turned off by the controller thereby preventing eye damage by said laser beam.

BRIEF DESCRIPTION OF THE DRAWINGS

These and other features of the preferred embodiments of the invention will become more apparent in the following detailed description in which reference is made to the appended drawings, by example only, wherein.

DESCRIPTION OF THE PREFERRED EMBODIMENTS

Figure 1:
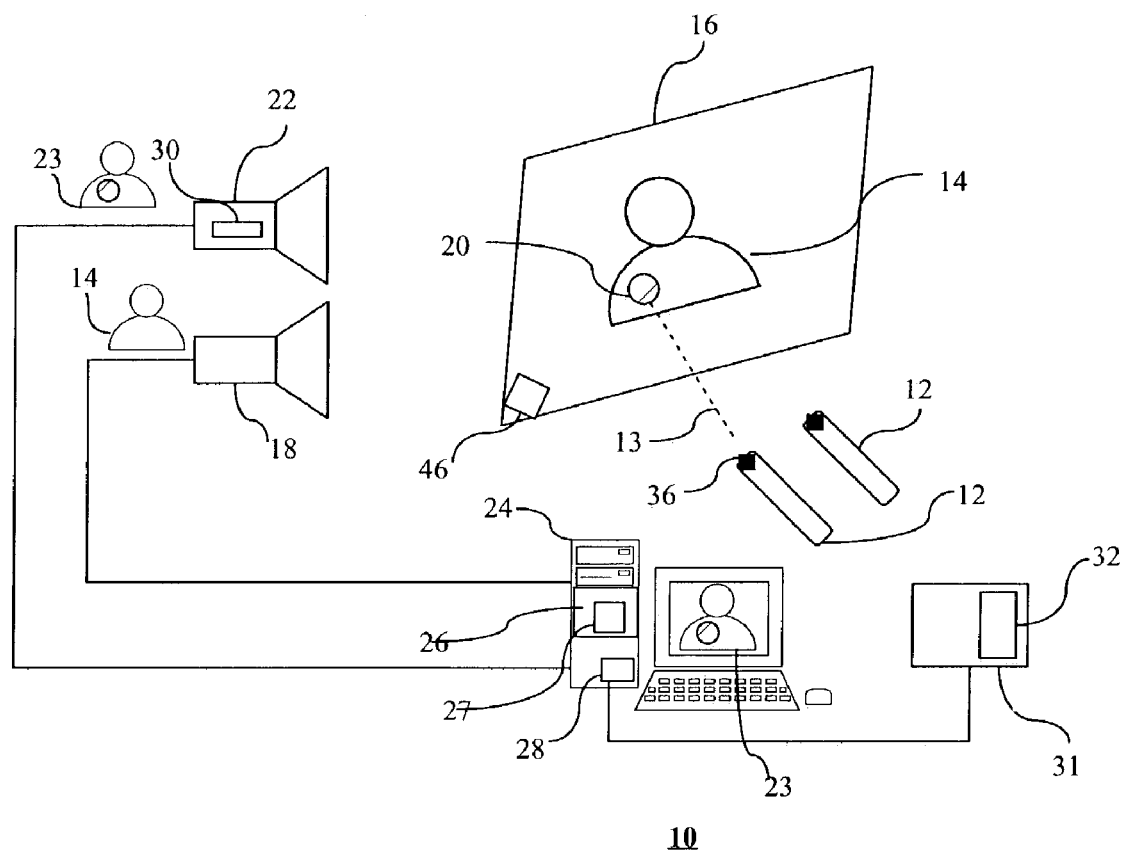
FIG. 1 is a schematic representation of a collaborative system.

Reference is first made to FIG. 1, which is an overview of a system 10 for implementing a method for allowing a plurality of input devices 12 to interact with a displayed image 14 on a screen or display 16. The image 14 is projected onto the display 16 by an image projector 18. Generally, the input devices 12 are laser pointers which include a laser that is relatively safe to users, such as a Class III A type laser. Each laser pointer 12 is caused to emit directional visible light or a laser beam 13 onto the display 16, which produces a visually recognizable laser spot 20 on the display 16.

The system 10 also includes a camera 22 for capturing successive images 14 on the display 16, to form captured images 23 thereof. The laser pointers 12, display 16 and projector 18, are coupled to a computer 24 which processes the captured images 23, and determines locations of laser spots 20 due to each laser pointer 12.

The computer 24 includes a processor 26 which receives captured images 23 from the camera 22. The processor 26 includes a filter 27 to aid in laser spot 20 detection by substantially removing noise and combating jitter on the display 16, especially when pointers 12 are used from a distance. The computer 24 also includes a computer readable medium including ROM, flash memory, non-volatile RAM, a magnetic disk, an optical disk, an IC memory card or a magnetic tape. Also, the computer 24 includes an operating system such as Microsoft® Windows 9x or XP, running at least one application program 28, which includes instructions for handling the simultaneous inputs from the laser pointers 12, and for analyzing laser spots 20 in captured images 23. The computer 24 also includes a plurality of input/output devices interfaced thereto via a plurality of corresponding ports, such as serial ports. The computer 24 may be communicatively coupled to a communication network such as local area network (LAN) or Internet, such that collaboration between remote multiple systems 10 is possible.

The processor 26, in conjunction with the application program 28 processes a captured image 23 and maps that captured image 23 to the projected image 14. The screen 16 may be a reflective screen such as CRT monitor, in which case the camera is placed in front of the screen. Alternatively, the screen 16 may be a transparent display, such that the camera 22 may be on either side of the screen 16. The captured image 23 is composed of a plurality of picture elements or pixels arranged in rows and columns. The pixels having a laser beam 13 impinging thereon will appear brighter than others, thus producing an area of higher intensity that defines a laser spot 20.

The camera 22 includes an image sensor 30 such as charge coupled device (CCD) or complimentary metal on oxide (CMOS) sensing device. The image sensor 30 converts light from the projected image 14 into an electric charge to produce an electric signal. Next, the electrical signal is passed through an analog to digital converter (ADC) in order to produce the image 23 in digital format, which is useable by the computer 24. Included in the computer 24 is a processor 26 for analyzing the captured image 23 to determine the position of the laser spots 20 on the captured image 23 in relation to the projected image 14.

The processor 26 includes an algorithm for determining pixels having a brightness exceeding a predetermined threshold within any given captured frame 23, and designates those areas as laser spots 20. The laser-spots 20 vary in brightness depending on the distance of the user to the screen 16.

Also, coupled to the computer 24 is a controller 31, which includes an electronic control circuit 32 for receiving control signals for the laser pointers from the computer 24, via an I/O port, such as Firewire, USB, parallel, serial, Ethernet, and so forth. The control signals are related to the operating characteristics of the laser pointers 12, such as voltage, power, duty cycle and modulation frequency. The controller 31 also transmits actions of the user, such as selections from a menu to the application program 28.

In general, perspective mapping is used when dealing with a camera 22 having substantially superior specifications or optics, otherwise the captured image 23 may be distorted and may need to be compensated. However, the captured image 23 may be too bright which causes errors due to over-saturation of the image sensors 23, in which case the brightness is controlled by reducing the aperture of the camera 22 or reducing the shutter/exposure time. An added benefit of reducing the shutter time is the capture images 26 of a relatively fast moving pointer 12 are not blurred and do not form a trail within the image 23. Preferably, the laser pointers 12 are pointed to the display 16 at an angle less than 85 degrees from the normal of the screen 16 surface. Typically, there is latency period defining the time for the transmission of the captured image 23 from the camera 22 to the computer 20 and the time for the computation to detect the laser spot 20. By using gray scale images instead of color images and or compressed images, the latency period is substantially minimized.

Figure 2:
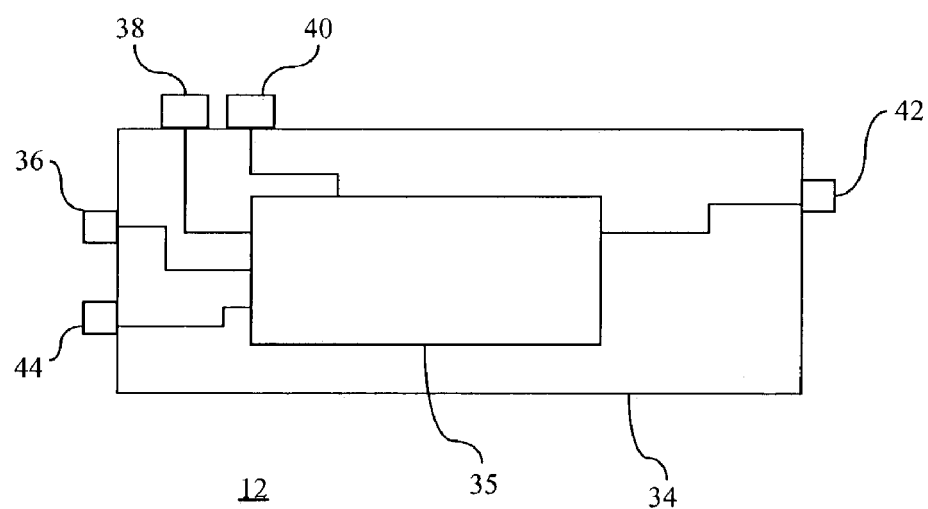
FIG. 2 is schematic representation of a laser pointer.

Now turning to FIG. 2 showing a laser pointer 12 in detail, a case 34 houses a slave circuit 35 responsive to the instructions of the electronic control circuit 32 and the input actions of the user. Secured to the case 34 and coupled to the slave circuit 35 is the laser emitter 36, a selection button 40, which includes the functions of powering-on the laser pointer 12, when actuated. The case also includes an infrared emitter or an ultrasound emitter 42, also responsive to actuation of the selection button 40. Additionally, the laser pointer 12 includes an infrared sensor 44 to detect infra-red light emanating from the display 16, such that the laser pointer 12 is only turned on when pointed in the general direction of the display 16. Therefore, power-on signal infrared LEDs 46 should be mounted near the screen 16, preferably the bottom or the top, to transmit the power-on signal to the laser pointers 12. Advantageously, the life of the laser emitter 36 can be substantially prolonged as the laser emitter 36 does not transmit unnecessarily, and the possibility of eye damage is considerably minimized.

The laser pointers 12 are coupled to the controller 31 via a cable or wirelessly using optical, infra-red, ultrasonic or radio transmission. However, different wireless technologies may be employed for the power-on signal and to transmit a selection signal due to the actuation of the selection button 40. For example, the laser pointers 12 may use infra-red signals for the power-on signal and ultrasound signals for the selection button 40 or button press. However, if the same transmission technology is used then the transmit frequencies for the power-on signal and the selection signal are sufficiently separated in order to avoid interference or cross-talk.

As mentioned above, it is desirable to distinguish between laser spots 20 due to the plurality of laser pointers 12.

Therefore, each laser pointer 12 is associated with a unique power duty cycle and emits lasers 13 after the power-on signal has been registered by the electronic control circuit 33, or during the time the selection button 40 is actuated. The laser emitter 36 is turned on and off in a predetermined pattern, until a power off signal is received. These patterns are synchronized with the camera 22 image acquisition, such that the captured frames 23 are referenced to each laser pointer's 12 respective pattern, hence each laser pointer's 12 interaction with the projected image 14 can be tracked.

Figure 4:
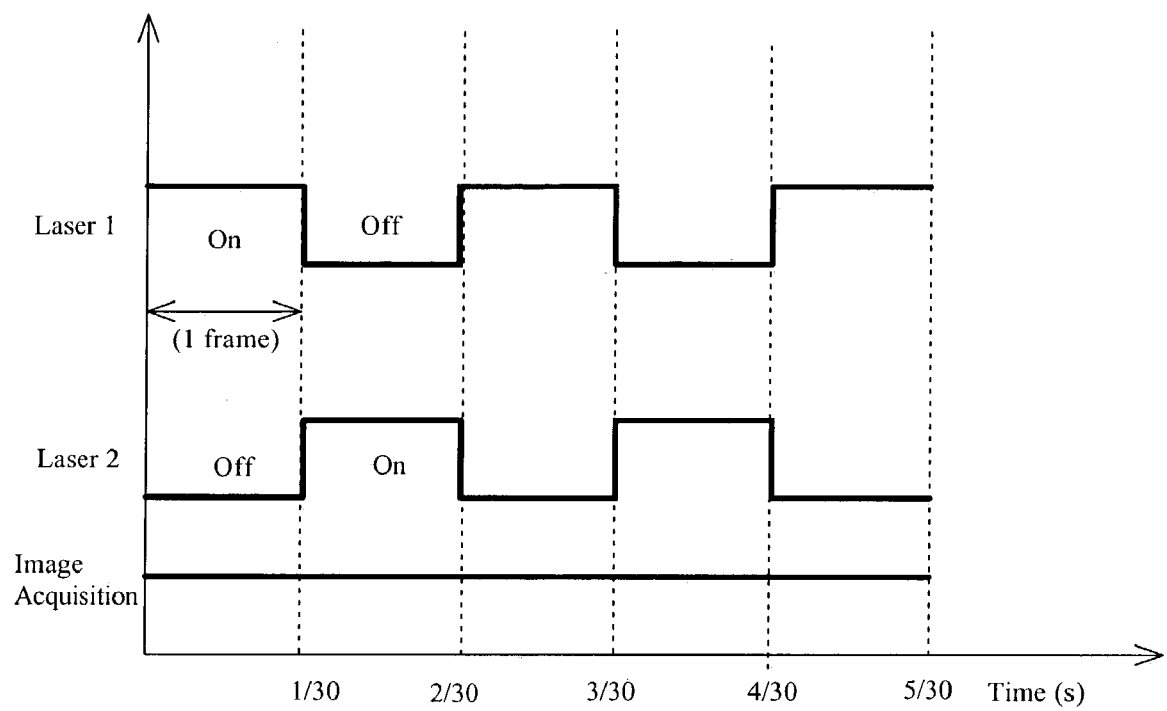
FIG. 4 is a timing diagram for two laser pointers.
Figures 5, 6:
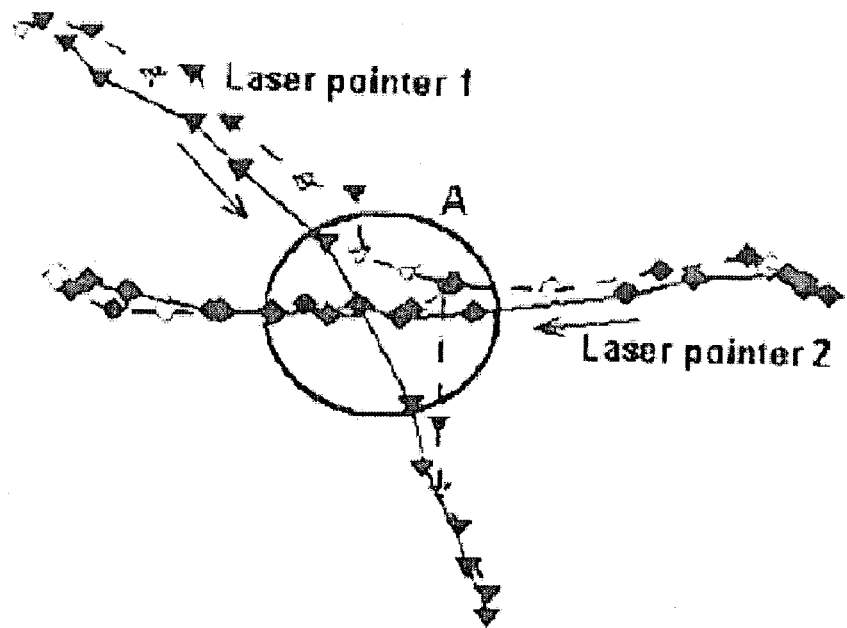
FIG. 5 is a chart showing a comparison between blinking patterns.
FIG. 6 shows the paths of two laser pointers.

In the preferred embodiment, the laser emitters 36 are blinked on and off in a binary or Gray code pattern, which maximizes the number of laser pointers 12 that can be used. By using the Gray code pattern each laser pointer 12 is turned on and off in turn for only one cycle of a predetermined repeated pattern. Therefore, for an n-bit Gray code, up to $2^n-1$ different laser pointers 12 may be used simultaneously with the system 10. Consequently, for a 60 Hz camera 22, reliable identification of up to 7 laser pointers 12 at 20 Hz with a cycle length of 3 is possible. FIG. 4 is a timing diagram for the laser pointers 12 and FIG. 5 is a chart showing a comparison between blinking patterns for n=3. Since turning the laser emitters 36 on and off may shorten the lifetime of the laser pointers 12, laser emitters 36 that support modulated input signals are generally used. The power to each laser emitter 36 is turned on in a cyclic pattern and each laser pointer 12 is only powered for a fraction of the time.

Blinking the laser pointers 12 on and off in their respective patterns results in the laser spots 20 due to the respective pointers 12 not being visible in every frame 23. Therefore, it may be a challenge to effectively track the laser spots 20, in every frame 14 for shutter speeds of 1/60s to 1/30s. For example, the system 10 may need to identify strokes created by the laser 28 pointers 12 or drawings performed with the laser pointer 12, as is possible on a whiteboard. Therefore, tracking laser spots 20 in order to plot a path of the laser spots, due to actions of the user, may be substantially difficult.

Tracking the path of each laser pointer 12 allows a user to identify with his or her actions on the display 16, and those actions of each of the other collaborators. In order to accomplish this, the processor 26 assigns positional coordinates to each of the detected laser spots 20 so as to produce a sequence of positional coordinates $(x_i, y_i)$ corresponding to sequential positions of the laser spot 20 in the projected image 14. The processor 26 determines a relationship between each pixel in the captured image 23 and the corresponding pixel on the projected image 14, such that interactions on the display 16 associated with any of the input devices 12 may be followed. Therefore, such interactions may be transmitted to a remote location or that location having the same projected image 14 may also interact in a collaborative manner.

Figure 3:
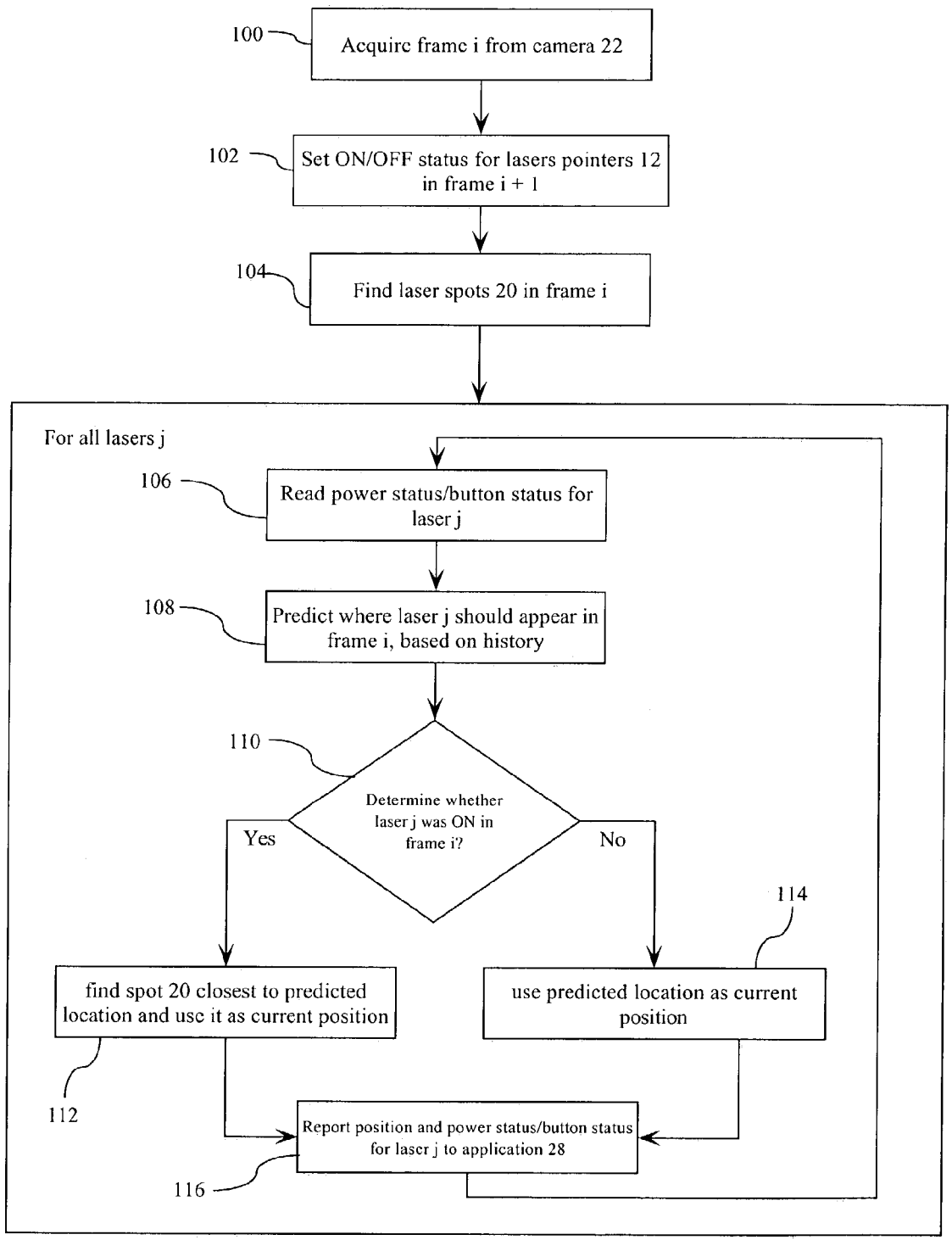
FIG. 3 is a flowchart showing the steps used for distinguishing multiple laser pointers in use with the system of FIG. 1.

A flowchart in FIG. 3 outlines a method for determining a position of a laser spot 20 on an image 14 due to each of the laser pointers 12, in order to track its path. The flowchart will be described with the aid of FIGS. 1 and 2. The method includes the steps of capturing the image 14 with the camera 22, and producing a sequence of captured images 23 or frames, in step 100. In the next step 102, each of the laser pointer's 12 power status registered with the application 28, in order to indicate whether the laser emitter 36 was emitting of during the frame i. Next, a determination is made as to whether any laser spots 20 are visible in frame i, in step 104. Due to the blinking pattern the laser spots 20 appear in the captured images 23 in a predetermined way or may not appear at all if the laser pointer 12 has been turned off, or pointing away from the screen 16. Therefore, in the next step 106, the power status of the laser pointers 12 during frame i+1 is registered with the application 28. Now, having located and identified the laser spots 20 due to each laser pointer 12 in accordance with the blinking pattern, the next step 108 includes the sub-steps of analyzing the capture frame i and frame i+1 to determine a location of laser spot 20 that does not appear in frame i, but appears in frame i−1 and frame i+1.

The location of the laser spot 20 in the frame i is predicted based on the location of the laser spot 20, due to the same laser pointer 12, in the frame i−1. In step 110, a determination is made by the application program 28 as to which of the laser pointers 12 was transmitting during frame i, and if the particular laser pointer 12 was on during frame i, then laser spot 20 closest to predicted location is designated as a current position of the laser spot 20 in that frame i, step 112; else if the particular laser pointer 12 was not transmitting during frame i, then the predicted location of the laser spot 20 is used as a current position. The position of the laser spot 20 is then reported to the application 28, in step 112, and the path of the laser pointer 12 is plotted and displayed.

For each frame i, the position where a laser spot 20 should appear is predicted using a Kalman filter 27 included in the processor 26 which supports estimations of past, present, and even future states. When a laser pointer 12 has been assigned to a detected spot 20, and after finding associations and updating the appropriate Kalman states, this information is sent to be recorded by the application program 28.

Therefore, the captured images 23 are stored in the computer readable medium of the computer 24 for examination of each captured image 23 by the processor 26 and the application program 28. Using the filter 27 and algorithms, the processor 26 and the application program 28 analyze the captured images 23 to determine whether the detected laser spots 20 appear in a predetermined blinking pattern, as chosen in step 102. Each laser spot 20 is tracked using the prediction process, such that the laser spot 20 that is closest to each predicted position is assigned to a corresponding laser pointer 12. Thus that respective laser input devices 12 are identified from recognition of the distinct patterns in the images 23.

However, depending on the circumstances, there may be laser spots 20 whose patterns can not be associated with a particular laser pointer 12 and laser spots 20 that can not be associated with the predicted positions. When a laser pointer 12 is first directed at the screen 16, the resulting laser spot in the initial frame 23 can not be associated with any previous laser spots 20, and so this laser spot 20 is classified as a starting point for a new laser pointer 12. Upon analysis of the subsequent frames 23, a pattern associated with the appearance of laser spots 20 develops, and so this pattern can be associated with a particular laser pointer 12, and the prediction process can now be employed. However, if after analysis of subsequent frames 23 there is no discernible blinking pattern and the laser spot 20 is not close enough to be associated with any other laser spots 20, it is assumed that laser pointer 12 has been turned off.

In another instance, if a previously identified laser pointer 12 is turned off for a number of frames 23 and then turned back on, the application program 28 once again analyzes the subsequent frames 23 for a blinking pattern. If this blinking pattern corresponds to a previously recognized pattern, then the application program 28 can link these current interactions of the laser pointer 12 to its past interactions, thus allowing for continuous tracking of the collaborator's actions.

Turning now to FIG. 6, a path for two laser pointers 12 recorded at 30 Hz is shown, in which the solid lines with black points are measured points and dashed lines with gray points illustrate the prediction, and unfilled shapes stand for predictions without a corresponding measurement. The first laser pointer '1' is designated by triangles and has the pattern '111', whereas the second laser pointer '2' is shown with diamonds and has the pattern '110'. Area A represents misclassifications in predicting the location of the laser spots 20, however these misclassifications are correctable using the afore-mentioned prediction techniques.

The classification of the acquired spots 20 depends only on the predictions for each frame i and their recorded state pattern. Although problems may arise if a laser spot 20 is not detected reliably due to very fast movements or when two laser spots 20 coincide, laser pointers '1' and '2' can be reliably identified at every third frame 23. Since the system 10 distinguishes between laser pointers '1' and '2', it can easily detect which laser pointer '1' or '2' is directed off the screen 16.

As is well known in the art, Class IIIA laser pointers 12 may cause temporary eye damage if the eye is directly exposed to the laser beam for more than 0.25 seconds. Therefore, the electronic control circuit 32 turns off power to the laser pointer 12 if its corresponding laser spot 20 is not detected in successive frames 23. In the preferred embodiment, the laser 13 is turned off after having not been present in nine frames 23, which corresponds to 0.15 seconds at 60 Hz and consequently is eye safe. However, should the user desire to turn the laser pointer 12 on again, the selection button 40 is pressed and the electronic control circuit 32 switches the laser on again, without reporting the button press to the application program 28. If the laser spot 20 is not visible in the next camera frame 23, it will turn off again.

In another embodiment, the system 10 includes a back-projected screen 16 with the camera 22 also behind the screen 16, as this allows users to move more freely. However, due to the space requirements of back-projected screens 16, one or more mirrors are often used to fold the optical path of the back-projected screen 16 and the optical path of the camera 22. However, direct reflection of the image projector 18 should be minimized, in order to substantially reduce saturation of the image 23.

In another embodiment, the system 10 can be configured to extend to over multiple displays or tiled displays 16. Therefore, the laser pointers 12 can support multiple/parallel inputs for such large-scale displays 16.

Therefore it has been shown that in order differentiate between lasers spots 20 due to the multiple laser pointers 12, each of the laser pointers 12 is assigned a unique or distinctive pattern. The system 10 supports multiple laser pointers 12 as interaction devices on one or more displays 16. Consequently, the system 10 affords seamless and parallel collaboration among several users.

In another embodiment, the functions carried out by the computer 24 of the preferred embodiment are performed by electronic circuit means, such as, a plurality of electronic circuit modules.

In another embodiment, the pointer 12 includes a power-on button 38 to turn on the laser pointer 12. Thus, if the laser 13 is turned off after having not been present in nine frames 23, the user may turn the laser pointer 12 on again by actuating the power-on button 38 or the selection button 40, without reporting the button press to the application program 28.

In another embodiment, the pointer 12 includes other actuators other than buttons, such as a slider or a selection wheel similar to a mouse wheel, and so forth.

In another embodiment, determination of the presence of laser spots 20 may be accomplished by analyzing the difference between a captured image 23 with the laser pointer 12 on and a captured image 23 with laser pointer 12 off. Alternatively, a more specialized computer algorithm geared to detect substantially small bright laser spots 20 may be employed.

Although the invention has been described with reference to certain specific embodiments, various modifications thereof will be apparent to those skilled in the art without departing from the spirit and scope of the invention as outlined in the claims appended hereto.

The invention claimed is:

1. A system for collaborating between a plurality of users, each user having a laser input device for interacting with an initial image, said system having:
    a controller for controlling operation of said laser input devices and registering interactions by said users via said laser input devices, each of said laser input devices operated by said controller to transmit a modulated laser beam having a distinct transmission pattern, each said distinct transmission pattern being produced by turning a respective one of said laser beams on and off according to a respective cycle, said laser beam producing a laser spot on said initial image;
    an initial image provider for providing said initial image on a display;
    a camera for capturing successive images to form a sequence of captured images for processing and mapping said successive images to said initial image, each of said successive images having a plurality of picture elements; and
    a processor for analyzing said successive images to determine the presence of said laser spots, wherein respective laser spots turn on and off such that they appear in certain ones of said successive images in accordance with said distinct transmission pattern;
    whereby said processor determines a relationship between each pixel in each said successive image and the corresponding pixel on said initial image, and determines interactions on said display associated with said laser input devices such that laser spots of each of said input devices are uniquely identified based on said distinct transmission patterns.

2. The system of claim 1 wherein said processor is a computer having a computer-readable medium including an application program to provide instructions to said initial image provider, display and controller, and for processing said captured images.

3. The system of claim 2 wherein said processor assigns positional coordinates to each said laser spots so as to produce a sequence of positional coordinates $(x_i, y_i)$ corresponding to sequential positions of said laser spot in said initial image.

4. The system of claim 3 wherein said each captured image is analyzed to predict a position of said laser spots when said laser spot due to a particular laser input device is missing.

5. The system of claim 1 wherein said laser input devices are coupled to said controller via wireless means.

6. The system of claim 1 wherein said laser spot includes picture elements having a brightness exceeding a predetermined threshold in said captured image.

7. The system of claim 1 wherein said distinct pattern includes pulsed power of predetermined frequency.

8. The system of claim 7 wherein said distinct pattern includes a binary or Gray code pattern.

9. The system of claim 1 wherein said laser input devices include an actuator to initiate said transmission of said laser beam as a means of said interaction.

10. The system of claim 1 wherein said laser beam is eye-safe.

11. The system of claim 10 wherein said laser beam is a Class IIIA laser.

12. The system of claim 10 wherein said controller causes said laser beam to be emitted for less than 0.25 seconds.

13. The system of claim 1 wherein if said laser spot is not detected in a predetermined number of successive captured images said laser beam is turned off by said controller.

14. The system of claim 13 wherein said predetermined number of successive captured images is nine when said predetermined frequency is 60 Hz.

15. A method for determining a position of a laser spot on an initial image in the presence of a plurality of laser pointers, the method having the steps of:
  acquiring a sequence of images from a camera directed at said initial image to produce i captured images thereof, each of said captured images comprising image elements forming a frame;
  assigning to each of said laser pointers, a distinct transmission pattern, each said distinct transmission pattern being produced by turning a respective one of said laser spots on and off according to a respective cycle;
  registering said appearance of said laser spots of each of said laser pointers during frame i with a processor;
  registering said appearance of said laser spots of each of said laser pointers during frame i+1 and frame i−1 with said processor;
  assigning positional coordinates to each of said located laser spots so as to produce a sequence of positional coordinates $(x_i, y_i)$ corresponding to sequential positions of the laser spot with respect to said initial image;
  determining which of said laser input devices was transmitting during said frame i according to said distinct transmission pattern and said positional coordinates; and
  reporting said location of said laser spot in frame i;
  whereby said laser spots turn on and off such that they appear in said captured images in a pattern corresponding to said distinct transmission pattern and each of said laser pointers is uniquely identifiable and can thereby be tracked.

16. The method of claim 15 wherein said laser pointers are caused to transmit for less than 0.25 seconds.

17. The method of claim 15 wherein if said laser spot is not detected in a predetermined number of successive captured images, the laser beam is turned off.

18. The method of claim 17 wherein said predetermined number of successive captured images is nine frames when said unique transmission pattern has a frequency of 60 Hz.

19. The method of claim 15 wherein a location of said laser spot in frame i is predicted based on positional coordinates $(x_i, y_i)$ of laser spots located in said frame i−1, and said step of determining which of said laser input devices was transmitting during said frame i includes designating a laser spot closest to a predicted location as current position or using predicted location as current position.

* * * * *